(12) United States Patent
Faour et al.

(10) Patent No.: US 6,857,017 B1
(45) Date of Patent: Feb. 15, 2005

(54) CUSTOMIZABLE NOTIFICATION USER WINDOW

(75) Inventors: Carolyn C. Faour, Allen, TX (US);
Richard Primeaux, Austin, TX (US)

(73) Assignee: i2 Technologies US, Inc., Dallas, TX (US)

( * ) Notice: Subject to any disclaimer, the term of this patent is extended or adjusted under 35 U.S.C. 154(b) by 762 days.

(21) Appl. No.: 09/686,442

(22) Filed: Oct. 10, 2000

Related U.S. Application Data

(60) Provisional application No. 60/158,730, filed on Oct. 11, 1999.

(51) Int. Cl.[7] ............................................. G06F 15/16
(52) U.S. Cl. ........................ 709/224; 345/733; 345/741
(58) Field of Search ................................ 709/224, 230, 709/332, 203, 219, 206, 223, 318; 345/779, 619, 708–709, 853–854, 745, 733; 600/523; 455/26.1; 713/200; 703/22

(56) References Cited

U.S. PATENT DOCUMENTS

| | | | | |
|---|---|---|---|---|
| 5,063,523 A | * | 11/1991 | Vrenjak | 709/223 |
| 5,237,684 A | * | 8/1993 | Record et al. | 709/318 |
| 5,420,968 A | | 5/1995 | Johri | 395/133 |
| 5,447,164 A | * | 9/1995 | Shaya et al. | 600/523 |
| 5,493,692 A | * | 2/1996 | Theimer et al. | 455/26.1 |
| 5,617,526 A | | 4/1997 | Oran et al. | 395/326 |
| 5,959,621 A | * | 9/1999 | Nawaz et al. | 345/733 |
| 5,978,566 A | * | 11/1999 | Plank et al. | 709/206 |
| 6,141,010 A | * | 10/2000 | Hoyle | 345/854 |
| 6,147,975 A | * | 11/2000 | Bowman-Amuah | 370/252 |
| 6,148,330 A | * | 11/2000 | Puri et al. | 709/219 |
| 6,256,667 B1 | * | 7/2001 | Wåhlander et al. | 709/218 |
| 6,278,965 B1 | * | 8/2001 | Glass et al. | 703/22 |
| 6,347,374 B1 | * | 2/2002 | Drake et al. | 713/200 |

FOREIGN PATENT DOCUMENTS

WO WO 99/40512 12/1999 ............. G06F/9/44

* cited by examiner

*Primary Examiner*—Marc D. Thompson
(74) *Attorney, Agent, or Firm*—Baker Botts L.L.P.

(57) ABSTRACT

A system for customizing user displays on a computer includes the generation of events by an event handler in communication with executing applications. By registering for selected events, and groups of events, a user may have certain notifications sent to their desktops. Available types of notifications may be categorized, and users can customize their notification window by selecting events, and categories of events, from those available.

27 Claims, 6 Drawing Sheets

|  EVENTS | RECIPIENTS |
| --- | --- |
| EVENT TYPE 1 | R1, R2, R3 |
| EVENT TYPE 2 | R2, R4 |
| EVENT TYPE 3 | ∅ |
| EVENT TYPE 4 | R5 |
| EVENT TYPE 5 | R2, R5 |
| ⋮ | |

FIG 5

GROUP 1

```
ELEMENT-A : SUM
ELEMENT-B : COUNT
ELEMENT-C : ALERT
ELEMENT-D : COUNT
```
60

GROUP 2

```
ELEMENT-E : SUM
ELEMENT-F : SUM
ELEMENT-G : ALERT
ELEMENT-H : COUNT
```
62

| CRM Group Name | Element name | Active | Default | Display type | Role name |
|---|---|---|---|---|---|
| Your Orders | PendingOrderCount | True | True | Integer | Purchaser |
| | OpenOrderCount | True | True | Integer | Purchaser |
| | OpenOrderMonetaryValue | True | True | Currency | Purchaser |
| | ClosedOrderCount | True | True | Integer | Purchaser |
| | ClosedOrderMonetaryValue | True | True | Currency | Purchaser |
| | CancelledOrderCount | True | True | Integer | Purchaser |
| | CancelledOrderMonetaryValue | True | True | Currency | Purchaser |
| | InProcessOrderCount | True | True | Integer | Purchaser |
| | InProcessOrderMonetaryValue | True | True | Currency | Purchaser |
| | ShoppingCartItems | True | True | Integer | Purchaser |
| | ShoppingListItems | True | True | Integer | Purchaser |
| Your Requests | OpenCustomerRequests | True | True | Integer | Support request submitter |
| | ClosedCustomerRequests | True | True | Integer | Support request submitter |
| | PendingCustomerRequests | True | True | Integer | Support request submitter |
| | OpenSupportRepRequests | True | True | Integer | Support request responder |
| | WaitingCustomerRequests | True | True | Integer | Support request submitter |
| | WaitingSupportRepRequests | True | True | Integer | Support request responder |
| | PendingSupportRepRequests | True | True | Integer | Support request responder |
| Your Products | RegisteredProducts | True | True | Integer | Product registrant |
| | ProductCategories | True | True | Integer | Product catalog manager |
| | ProductAlerts | True | True | IAlert* | Purchaser |
| | ActiveProducts | True | True | Integer | Product catalog manager |
| | InactiveProducts | True | True | Integer | Product catalog manager |

FIG 8

CUSTOMIZABLE NOTIFICATION USER WINDOW

CROSS-REFERENCE TO RELATED APPLICATION

This application claims the benefit under 35 U.S.C. § 119(e) of U.S. Provisional Application No. 60/158,730, filed Oct. 11, 1999. This application is also related to U.S. Patent No. 6,631,363 B1 to Brown, et al. filed Oct. 10, 2000, issued Oct. 7, 2003, titled RULES-BASED NOTIFICATION SYSTEM, and assigned to the assignee hereof, which is hereby incorporated by reference hereinto.

BACKGROUND OF THE INVENTION

1. Field of the Invention

The present invention relates generally to computer systems, and more specifically to a system and method for displaying user-selected information on a user's computer.

2. Description of the Prior Art

As computer systems and data communications become increasingly widespread, more and more users are able to perform a high percentage of their daily tasks over various communication networks. For example, many users are able to obtain key information in a timely manner through the use of interconnected software and hardware systems.

Because of the great wealth of information available, it often becomes time consuming for a user to keep up with items and events of interest. In some cases, a dedicated window may be included on a user's desktop to provide information about high priority items. For example, a streaming stock quote ticker may be resident on a user's desktop to enable them to keep up with selected stock market information. However, the number and variety of sources of potentially interesting information is so large that this type of dedicated approach can work for only a small number of sources.

Often, a user is required to access a database or other source of information in order to determine whether an event of interest has occurred. This can be relatively time consuming, and often results in undesirable delays if the user is unable to check the required sources often enough.

Another approach is to automatically send notifications directly from an application to a user when selected events occur. This requires coding of the necessary handling and routing modules within the application. This can become a significant burden from the application writer's standpoint, and can lead to inconsistencies in the way message notifications are presented to users.

In addition, when an application contains code to send notifications to users, the user generally loses the ability to select which messages he or she wishes to see. To build into each application code which would allow every user to tailor messages as they saw fit is a task of such complexity that it is not practical to provide such a feature.

It would be desirable to provide a system and method for allowing a user to customize a window which informs them of items of interest to the user. It would be further desirable for users to have the capability of receiving selected categories of events which the owner of executing applications believes will be of interest to the user.

SUMMARY OF THE INVENTION

In accordance with the present invention, a system for customizing user displays on a computer includes the generation of events by an event handler in communication with executing applications. By registering for selected events, and groups of events, a user may have certain notifications sent to their desktops. Available types of notifications may be categorized, and users can customize their notification window by selecting events, and categories of events, from those available.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

The following description refers to a preferred embodiment illustrating the principles behind the invention. However, it will be understood by those skilled in the art that the described system and method can be implemented in numerous systems. A preferred method for generating events and alerts is described, but the described customizable display could also be used with other appropriate systems.

Figure 1:
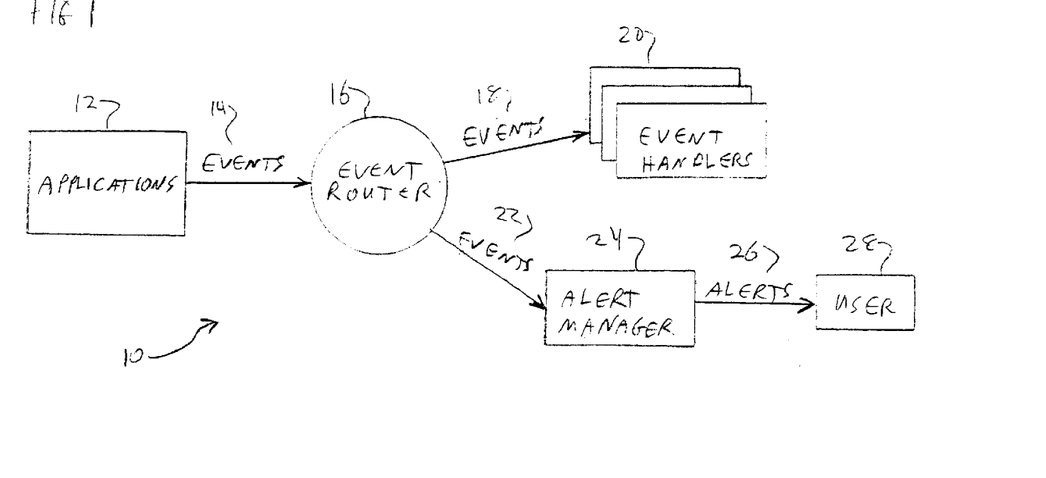
FIG. 1 is a high-level block diagram of a system in accordance with the present invention.

Referring to FIG. 1, a preferred embodiment of the inventive system and method is illustrated generally as reference number 10. A plurality of applications 12 operate concurrently, and may be located on a single piece of hardware, or spread among numerous machines. The applications 12 need not operate in conjunction with one another, but may be a wide variety of selected applications, of any type, which perform data processing functions.

As will be described in more detail in connection with FIG. 2, applications 12 generate events 14, which are forwarded to an event router 16. Events 14 are basically messages indicating that some type of predetermined event has occurred. As defined further in connection with FIG. 2, these messages may be generated directly by applications to indicate that an event has occurred in that application. For example, an application that is used to change the price of a product in a database can generate an event message indicating the product number and new price for the product. In addition, as described below, certain types of applications 12 may periodically scan persistent information, such as that stored in databases, to determine whether data has changed. These applications can also generate events showing that changes of the selected type have occurred.

Event router 16 is described in more detail in connection with FIG. 4, but is generally an application which receives incoming events 14 and routes them to recipients which have registered to receive events of this type. For example, if a user or another application has registered to receive notification of price change events, the event router 16 will maintain this information. When an incoming price change event is received by event router 16, it will then be forwarded to all applications which have been registered to receive this event.

Event router 16 therefore acts as a central routing point for messages. It is not necessary for applications 12 to know, or be able to find out, who will receive notifications of events. Instead, applications 12 simply generate defined events and send all of them to event router 16. Event router 16 handles the task of sending the events to as many recipients as are registered to receive them.

Some events 18 are "routed to various types of event handlers 20, which then use the incoming event message to process data. In many cases, event handlers 20 will also be classified as applications 12. In this application, event handlers 20 are generally any applications which make some use of the information provided by incoming event messages 18.

Some events 22 are routed to an alert manager 24, which is a particular type of event handler. As described further in connection with the remaining figures, alert manager 24 handles incoming events by determining whether any incoming event requires that a notification, or alert 26, is to be forwarded to a user 28. Alert manager 24 utilizes a set of rules to determine to whom, and when, notifications should be made to a user 28. Messages that are not considered to be alerts can also be forwarded to the user by event handlers 20 as described further below.

Figure 2:
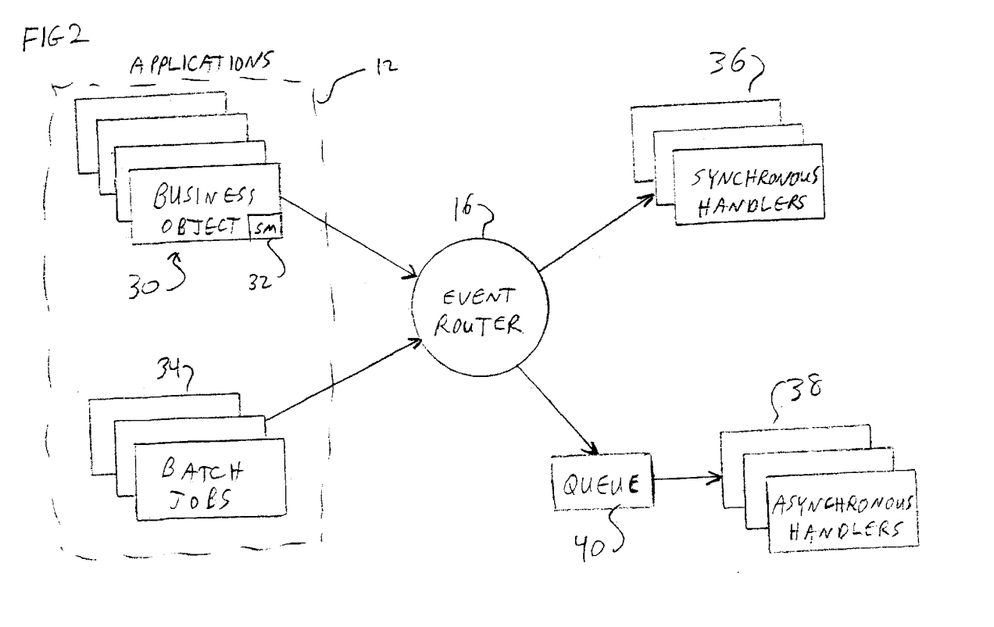
FIG. 2 is a block diagram indicating additional details of the system of FIG. 1.

Referring to FIG. 2, the types of applications 12 which generate events may be classified generally into two categories. The first category is referred to herein as business objects 30, which may include within them state machines 32 and similar operating modules. Business objects 30 generate "explicit" events, meaning that the code of the business object application explicitly generates an event to be sent to event router 16 as events occur. This capability must be programmed into business objects 30 and their state machines 32.

Explicit events are useful in the present invention for indicating when a single event has occurred. For example, when a sale is made, a product changes price, or a new product becomes available, if the corresponding business objects are properly programmed, events will be generated. These can be picked up by alert manager 24, and used to generate notifications.

A second kind of application that can generate events is referred to herein generally as "batch jobs." These batch jobs are applications that generally periodically check persistent data, such as data stored in a database, and look for changes that may have occurred. For example, if an application which enters new products into a database is not one which has previously been coded as a business object, to generate explicit events on this occurrence, a batch job 34 can periodically scan a product database and determine when new products have been added. Events which are discovered by such a comparison between a previous state of an object, in a persistent memory, with the current state are referred to herein as "implicit events."

Use of batch jobs to scan data looking for implicit events is useful both for events which occur over time, and for use with applications which are not already coded to generate the desired explicit events.

Event router 16 can route events to two different types of handlers. These can be categorized generally as synchronous handlers 36 and asynchronous handlers 38. Events which are intended for use by asynchronous handlers are preferably placed into a queue 40, from which they are later withdrawn by various asynchronous handlers 38. More than one queue 40 can be provided, and registration of a handler with the event router to be notified of a particular type of event will indicate whether the handler is synchronous or asynchronous, and in the later case indicate which queue is used for the event message.

Figure 3A:
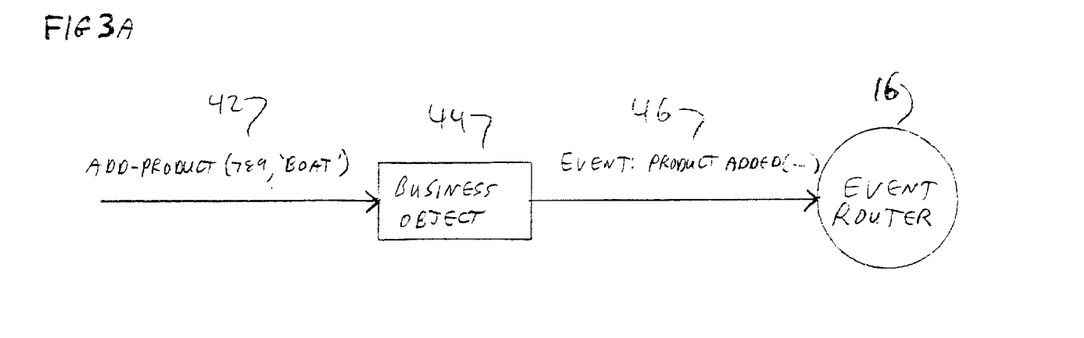
FIGS. 3A and 3B illustrate operation of different types of event generation techniques.
Figure 3B:
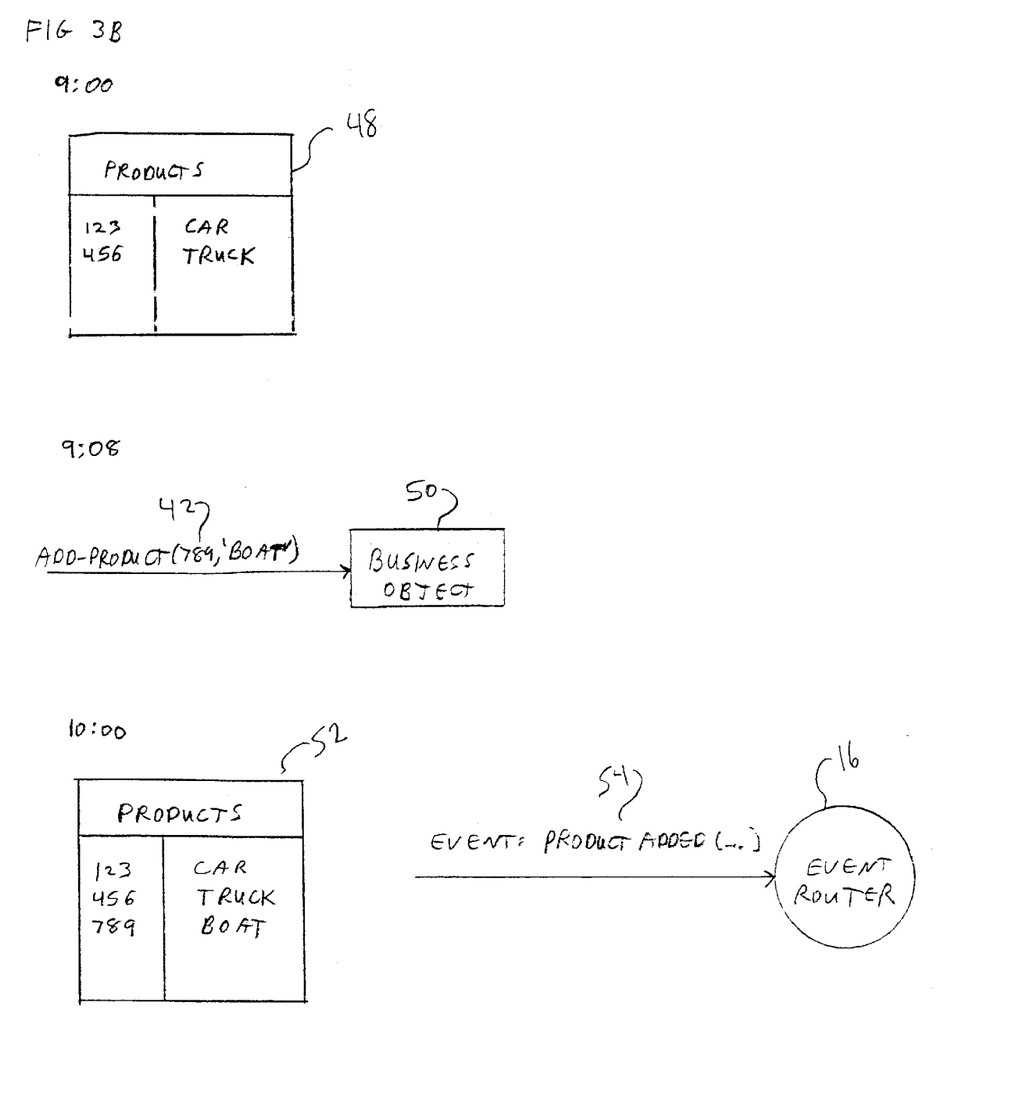

FIGS. 3A and 3B illustrate the operational difference between explicit and implicit events. In FIG. 3A, dataflow occurring upon an explicit event is shown. In this example, a user running an application enters a new product, number 789, and identified as a "BOAT", into the system.

When the user desires to add the product, procedure add-product is executed 42. This procedure passes the new product number, '789', and the new item description, 'BOAT', to business object 44. When the new product is set up by business object 44, an event 46 is generated and sent to event router 16. Event 46 indicates that a new product has been added and passes the relevant parameters as part of the message.

Referring to FIG. 3B, addition of the same product is illustrated when no business object is available to generate an explicit event. Instead, it will be assumed that an appropriate batch object 34 runs periodically to check a persistent database. In this example, the batch job runs at 9:00 o'clock and detects a table in the database which shows two products, numbers 123 and 456. This information is retained by the batch object for future use. At a subsequent time, 9:08 in this example, a user executes the add-product procedure as was the case in FIG. 3A. However, business object 50 is one which does not generate an explicit event message when the database is updated. Thus, no message is sent to event router 16 at 9:08.

At 10:00, in this example, the batch job executes again. At this time, the information it collects is shown in table 52 and includes three products. By comparing the present table 52 with earlier table 48, the batch job determines that a new product has been added to the database. The batch job then generates an implicit event showing that the new product has been added, and sends it to router 16.

Depending upon the implementation, it may be desirable for implicit events to carry a flag distinguishing them from explicit events to assist either the router or handler in determining how to treat the message. However, in other cases, it may not be necessary to distinguish between implicit and explicit events; only the fact that an event occurs would be of interest to the handlers.

Figure 4:
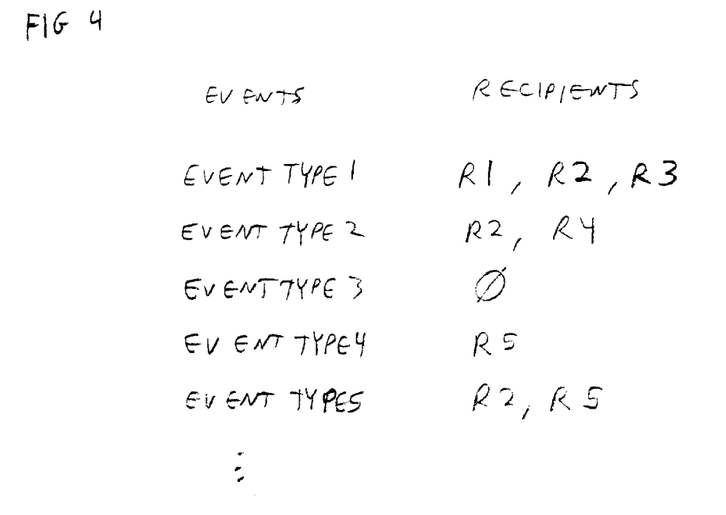
FIG. 4 shows the type of information maintained by an event router in accordance with the present invention.

FIG. 4 indicates the type of information retained by event router 16 in order to route events which it receives. The information is shown in FIG. 4 as a table, but may be stored internally within event router 16 in any desirable form.

Referring to FIG. 4, the table indicates that event router 16 stores a list of types of events which are to be routed. This table is preferably dynamic and can be added to as various handlers register with event router 16. In the example of FIG. 4, EVENT TYPE 1 has three recipients, R1, R2 and R3, registered to receive a copy of this type of event. Thus, when an event of EVENT TYPE 1 is received by event router 16, recipients R1, R2 and R3 in turn receive a copy of the event message. Identification of the recipient indicates where the message will be sent, and any other particular conditions under which it should be forwarded. If any recipients R1, R2 or R3 are synchronous handlers, the event message will be copied and forwarded to them immediately, If any of these recipients are asynchronous events, the registration of such event will indicate a queue into which a copy of the event message should be placed.

FIG. 4 shows five different even t types, with various recipients registered to receive them. Some event types, such as EVENT TYPE 3 in this case, may not have any registered recipients. In such case, any events of this type are not routed to a handler. In most cases, how ever, one or more recipients will be registered to receive an event, and event router 16 will forward copies of the event message to all registered recipients.

By use of the event router, recipients can register to receive messages of various types without having any impact on the business objects which generate these events. Instead, the events are consistently passed to event router 16, from which any handler which needs to be copied on the event message receives its forwarded copy. Each handler will then deal with a message according to its internal logic.

Events which are routed to users are preferably generated by both alert manager 24 and other event handlers 20. For convenience, the events may all be referred to as elements. In addition, users may need to know information which is not categorized as alerts, but more accurately a description of the state of the system. For example, a user may need to know how many pending orders are waiting to be shipped. Alerts can be generated to inform the user when a pending order is shipped, but a sum total of the number of orders waiting for shipment may also be useful. This total is not information in the nature of an alert, and is handled by an event handler 20 which is not an alert manager. These event h andlers can keep track of, for example, the number of orders waiting to be shipped and update a user's display when the information changes.

Items of information which need to be sent to a user, including alerts and other information, are referred to as elements. Preferably elements are grouped into categories which are logical for the application at hand. Different types of users are allowed access to different groups of elements.

Figure 5:
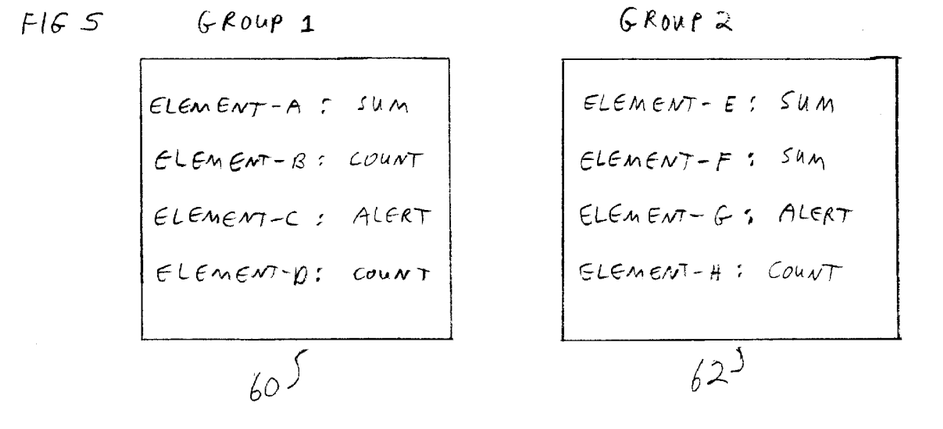
FIG. 5 illustrates grouping of elements.

This concept is illustrated generally in FIG. 5, which shows two groups of elements, Group 1 60 and Group 2 62. In this example, each Group 60, 62 contains four elements. In the general case, groups can contain different number of elements.

Each element has a type which determines how it is displayed to the user. Useful types include, for example, a count of items or a sum of items. A count is useful to describe, for example, a number of orders waiting to be shipped. A type of sum can be applied to the dollar value of those orders and can show the total dollar value of all orders waiting to be shipped. Sum can also be used for other types of units, such as number of individual items in an order, total number or items in all orders waiting to be shipped, and so forth.

Another element type is the alert type, which is a message to the user indicating that a certain event has taken place which satisfies an alert rule. These will generally be text messages, generally incorporating data within the message.

Figure 6:
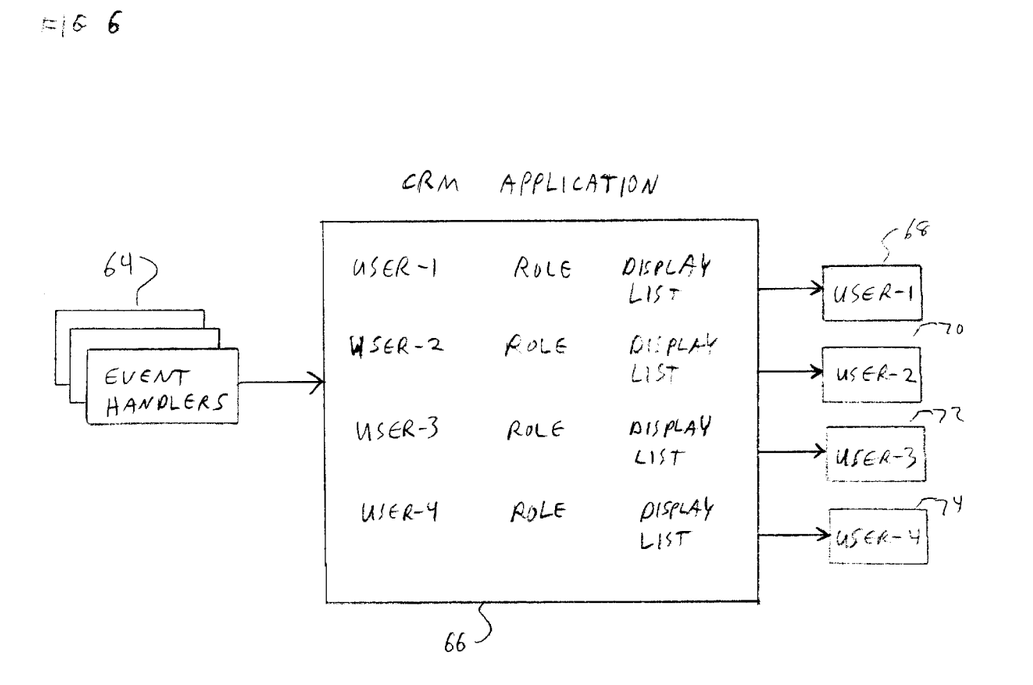
FIG. 6 is a block diagram illustrating operation of the preferred embodiment.

Each user can be assigned a role, which determines which groups of elements they have access to. This is illustrated in FIG. 6, where event handlers, indicated generally as reference number 64, supply events to an application 66. Application 66 is referred to herein as a customer relationship monitor (CRM), for example and may be any application which is desired to perform the following functions.

CRM 66 is used to drive information to the displays of users 68, 70, 72, 74. CRM 66 can, if desired, be implemented as a relatively complex event handler, or may be a separate application which takes input from event handlers and interfaces with users. CRM 66 will register with event router 16 as described above, rather than having each individual user 68–74 do so, to. keep router tables within event router 16 from becoming too large.

Each user registers with CRM 66 and is assigned a role. As described above, the role assigned to a user determines which event groups that user may display. Within each group, the user may select which elements are actually to be displayed on their computer in a dashboard window, allowing the user to customize the display. CRM 66 maintains tables of all users which may access elements of the system, the role of each user, and the display list of elements which that user desires to see.

Figure 7:
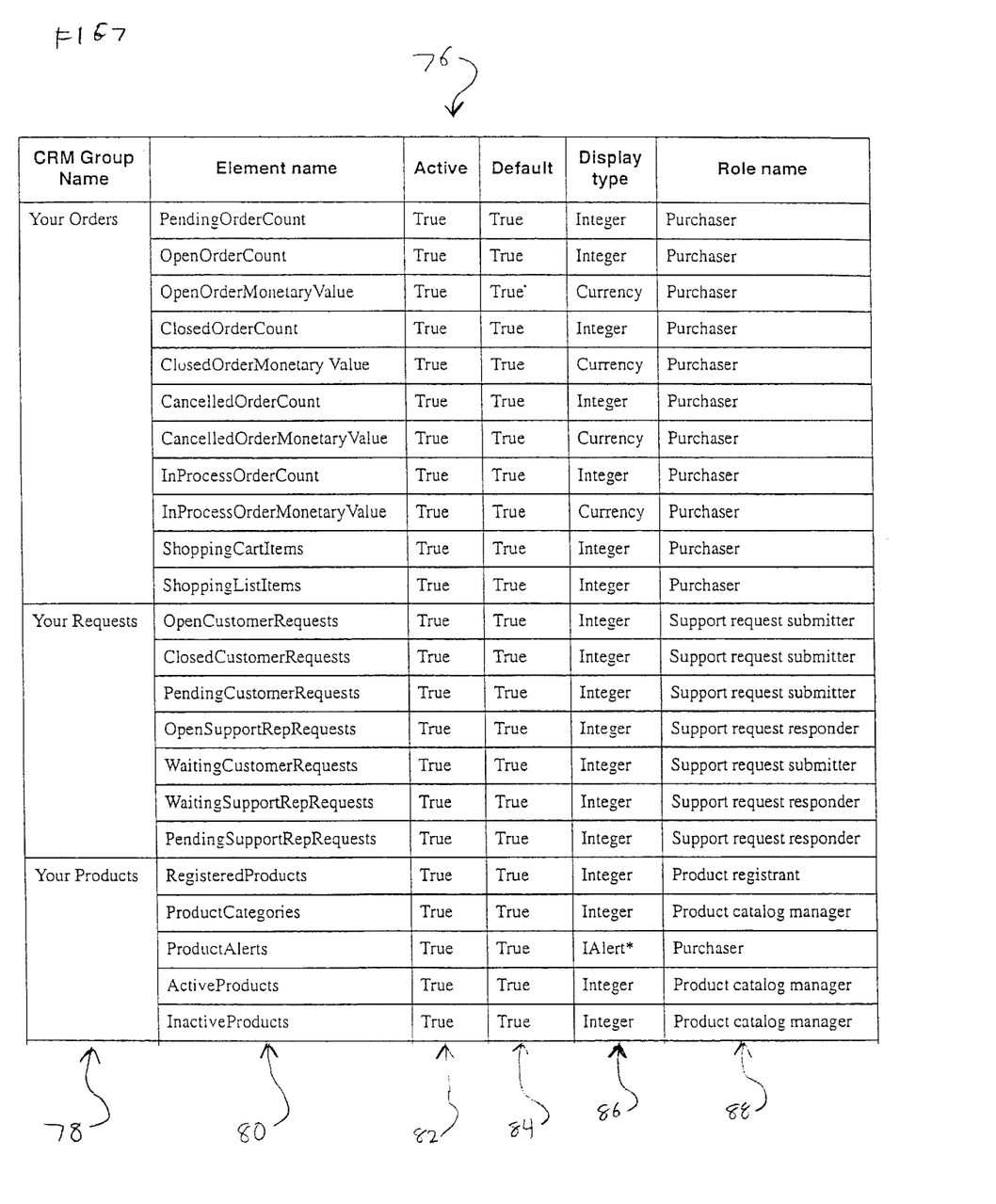
FIG. 7 is a table showing a relationship between elements and groups.

FIG. 7 is a table showing some specific types of information contained within CRM 66 as an example. Table 76 has several columns representing information relating to a number of elements. Column 78 is a group name, and the elements in this table are organized into three groups. Element name column 80 is the name of each element within each group, and columns 82 and 84, respectively, indicate whether the user has selected a particular element for display and whether the element is display ed by default until the user makes a specific selection. Column 86 indicates the type of information display ed for that element, and column 88 defines the user roles which have access to those elements. In the example of FIG. 7, a user in the role of purchaser has access to all elements in the "your orders" group and the "product alerts" element in the "your products" group.

This table is used for purposes of example only, and it will be appreciated by those skilled in the art that any elements which would be of interest to a user may be included, and may grouped as desired in any logical grouping.

Figure 8:
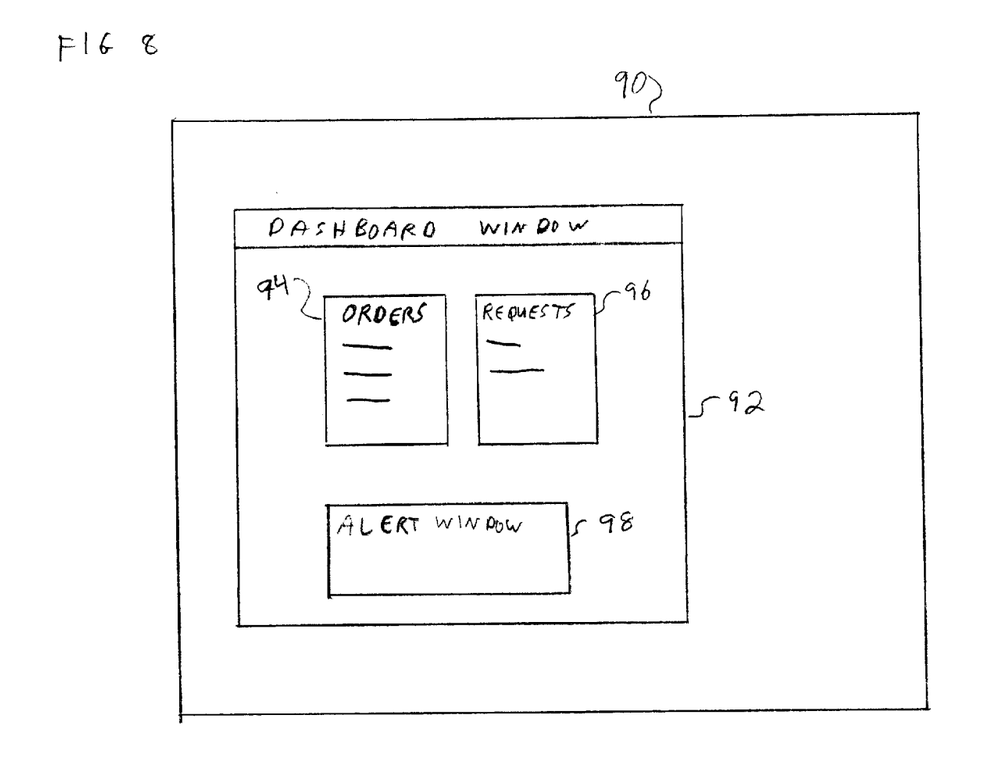
FIG. 8 is a diagrammatic view of a user display having a dashboard window.

Once an element has been selected for display in the user's window, a special window, called a "dashboard window" is preferably set aside for display of this information. Referring to FIG. 8, a user's computer display 90 preferably includes a dashboard window 92. Information can be grouped as desired within dashboard window 92, preferably organized by the groups described above. In FIG. 8, a separate table is provided for orders 94, requests 96, and alerts 98. Elements displayed in the orders 94 and requests 96 windows will typically have a static description such as "orders waiting to be shipped", followed by a number which will change from time to time as the underlying data changes. Alert window 98 will generally be empty until an alert is received, preferably in the form of a text message. Alerts can remain in alert window 98 for a time out period, or until they are specifically acknowledged by the user.

Each element and alert displayed within the interior tables 94, 96, 98 within dashboard window 92 preferably include a hyperlink or similar connecting link, which allows the user to quickly access the application underlying the element. For example, an application may allow a customer to check in detail upon the status of all of that customer's orders that are waiting to be shipped. Information such as expected ship date, mode of shipment, and any other commentary are normally accessed by such application. Within orders window 94, the customer may only have an element indicating a count of orders waiting to be shipped. In order to determine the status of these orders, the customer can click upon the link for that element and be taken directly to the application which details the status of all orders. In this manner, much information that is of importance to the user is not only summarized within the dashboard window 92, but made quickly available by direct links.

A business enterprise can make new information available to users at any time by adding elements to groups. When new elements are added to a group with a default value of true as shown in FIG. 7, those elements will be displayed is also dashboard windows for those users whose role gives them access to those elements. A user can then elect to hide the added elements or retain them in their personalized display.

In a similar manner, new groups of elements can be added, and all elements in the group will generally start with a default value of true. The elements will become visible to users with the appropriate role, as before, until the users cancel their display.

The described system provides a user with the ability to define a special dashboard window which receives both notification of events of interest, via alerts, and status information regarding other applications, via summary reports. By providing a link to the underlying application from the summary reports and notifications, a user is able to quickly obtain information of interest without having to maintain numerous applications open on the desktop.

While the invention has been particularly shown and described with reference to a preferred embodiment, it will be understood by those skilled in the art that various changes in form and detail may be made therein without departing from the spirit and scope of the invention.

What is claimed is:

1. A method for displaying information on a user display device, comprising:
   receiving a plurality of event messages, each event message being associated with an event and having been generated by an application;
   communicating selected subsets of event messages to one or more event handlers according to stored registration information specifying, for each of a plurality of subsets of event messages, one or more event handlers to which the subset of event messages should be communicated, each event handler having registered to receive event messages in one or more of the selected subsets of event messages;
   receiving a particular subset of event messages, each event message in the particular subset of event messages being associated with a corresponding element for communication to one or more user display devices each associated with a corresponding user, each element being associated with one or more element groups that each comprise one or more elements;
   for each event message in the received particular subset of event messages:
      determining the corresponding element associated with the event message;
      determining the element groups comprising the determined corresponding element associated with the event message;
      determining one or more roles associated with the determined element groups, each determined role defining one or more users that are authorized to receive the constituent elements of the determined element groups for display on the corresponding user display devices associated with the users;
      determining one or more users assigned the determined roles; and
      if a user is determined to be assigned one or more of the determined roles, communicating the corresponding element associated with the event message to the corresponding user display device associated with the user for display on the corresponding user display device.

2. The method of claim 1, wherein:
   the method further comprises displaying, for the corresponding element displayed on the corresponding user display device associated with the user, a link associated with the corresponding element; and
   the link, when selected by the user associated with the user display device, is operable to initiate opening of an associated application.

3. The method of claim 1, comprising:
   receiving registration information regarding a user from the associated user display device; and
   assigning a role to the user based on the registration information, the role defining one or more element groups for which the user is authorized to receive the constituent elements of the element groups for display on the corresponding user display device associated with the user.

4. The method of claim 3, comprising:
   receiving from the user a selection of an element within the one or more element groups defined by the role assigned to the user, the selection of the element indicating that the user desires to prevent the element from being communicated to the corresponding user display device associated with the user for display; and
   terminating communication of the selected element to the corresponding user display device associated with the user for display on the user display device.

5. The method of claim 1, comprising maintaining a table comprising, for each element group:
   an element name for each element associated with the element group;
   an element type of each element associated with the element group; and
   one or more role names for each element associated with the element group, each role name for an element indicating a role defining one or more users that are authorized to receive the element for display on the corresponding user display device associated with the user.

6. The method of claim 1, comprising maintaining, for each user:
   role information identifying the one or more roles assigned to the user; and
   display list information identifying:
      the one or more constituent elements of each element group whose constituent elements the user is authorized to receive as defined by the one or more roles assigned to the user; and
      an indication for each of the one or more constituent elements of whether the user has indicated a desire to terminate display of the element on the corresponding user display device associated with user.

7. The method of claim 1, wherein:
   each element comprises an element type indicating how the element is displayed on a user display device, and
   when the element comprises state information regarding a supply chain of an enterprise, the element type comprises one or more of:

a sum element type; and
a count element type.

8. The method claim 1, wherein:
each element comprises an element type indicating how the element is displayed on a user display device, and
when the element comprises alert information, the element type comprises an alert element type indicating that a particular event has occurred, the element comprising a notification for communication to the corresponding user display devices associated with users authorized to receive the element.

9. The method of claim 1, comprising communicating the corresponding element to a dashboard window displayed on the corresponding user display device associated with the user, the dashboard window comprising a separate window for each element group whose constituent elements the user is authorized to receive, the corresponding element being displayed in the separate window corresponding to the element group associated with the corresponding element.

10. A system for displaying information on a user display device, comprising:
an event router operable to:
receive a plurality of event messages, each event message being associated with an event and having been generated by an application; and
communicate selected subsets of event messages to one or more event handlers according to stored registration information specifying, for each of a plurality of subsets of event messages, one or more event handlers to which the subset of event messages should be communicated, each event handler having registered to receive event messages in one or more of the selected subsets of event messages; and
a customer relationship monitor operable to:
receive a particular subset of event messages, each event message in the particular subset of event messages being associated with a corresponding element for communication to one or more user display devices each associated with a corresponding user, each element being associated with one or more element groups that each comprise one or more elements;
for each event message in the received particular subset of event messages:
determine the corresponding element associated with the event message;
determine the element groups comprising the determined corresponding element associated with the event message;
determine one or more roles associated with the determined element groups, each determined role defining one or more users that are authorized to receive the constituent elements of the determined element groups for display on the corresponding user display devices associated with the users;
determine one or more users assigned the determined roles; and
if a user is determined to be assigned one or more of the determined roles, communicating the corresponding element associated with the event message to the corresponding user display device associated with the user for display on the corresponding user display device.

11. The system of claim 10, wherein:
the customer relationship monitor is further operable to display, for the corresponding element displayed on the corresponding user display device associated with the user; and
the link, when selected by the user of the associated with user display device, is operable to initiate opening of an associated application.

12. The system of claim 10, wherein the customer relationship monitor is operable to:
receive registration information regarding a user from the associated user display device; and
assign a role to the user based on the registration information, the role defining one or more element groups for which the user is authorized to receive the constituent elements of the element groups for display on the corresponding user display device associated with the users.

13. The system of claim 10, wherein the customer relationship monitor is operable to:
receive from the user a selection of an element within the one or more element groups defined by the role assigned to the user, the selection of the element indicating that the user desires to prevent the element from being communicated to the corresponding user display device associated with the user for display; and
terminate communication of the selected element to the user display device associated with the user for display on the user display device.

14. The system of claim 10, wherein the customer relationship monitor is operable to maintain a table comprising, for each element group:
an element name for each element associated with the element group;
an element type of each element associated with the element group; and
one or more role names for each element associated with the group, each role name for an element indicating a role defining one or more users that are authorized to receive the element for display on the corresponding user display device associated with the user.

15. The system of claim 14, wherein the customer relationship monitor is operable to maintain, for each user:
role information identifying the one or more roles assigned to the user; and
display list information identifying:
the one or more constituent elements of each element group whose constituent elements the user is authorized to receive as defined by the one or more roles assigned to the user; and
an indication for each of the one or more constituent elements of whether the user has indicated a desire to terminate display of the element on the corresponding user display device associated with the user.

16. The system of claim 10, wherein:
each element comprises an element type indicating how the element is displayed on a user display device; and
when an element comprises state information regarding a supply chain of an enterprise, the element type comprises one or more of:
a sum element type; and
a count element type.

17. The system claim 10, wherein
each element comprises an element type indicating how the element is displayed on a user display device; and
when the element comprises alert information, the element type comprises an alert element type indicating that a particular event has occurred, the element comprising a notification for communication to the corresponding user display devices associated with users authorized to receive the element.

18. The system of claim 10, wherein the customer relationship monitor is operable to communicate the corresponding element to a dashboard window displayed on the corresponding user display device associated with the user, the dashboard window comprising a separate window for each element group whose constituent elements the user is authorized to receive, the corresponding element being displayed in the separate window corresponding to the element group associated with the corresponding element.

19. Software for displaying information on a user display device, the software being embodied in computer-readable media and when executed operable to:
receive a plurality of event messages, each event message being associated with an event and having been generated by an application;
communicate selected subsets of event messages to one or more event handlers according to stored registration information specifying, for each of a plurality of subsets of event messages, one or more event handlers to which the subset of event messages should be communicated, each event handler having registered to receive event messages in one or more of the selected subsets of event messages;
receive a particular subset of event messages, each event message in the particular subset of event messages being associated with a corresponding element for communication to one or more user display devices each associated with a corresponding user, each element being associated with one or more element groups that each comprise one or more elements;
for each event message in the received particular subset of event messages:
 determine the corresponding element associated with the event message;
 determine the element groups comprising the determined corresponding element associated with the event message;
 determine one or more roles associated with the determined element groups, each determined role defining one or more users that are authorized to receive the constituent elements of the determined element groups for display on the corresponding user display devices associated with the users;
 determine one or more users assigned the determined roles; and
 if a user is determined to be assigned one or more of the determined roles, communicate the corresponding element associated with the event message to the corresponding user display device associated with the user for display on the corresponding user display device.

20. The software of claim 19, wherein:
the software is further operable to display, for the corresponding element displayed on the corresponding user display device associated with the user, a link associated with the corresponding element; and
the link, when selected by the user associated with the user display device, is operable to initiate opening of an associated application.

21. The software of claim 19, operable to:
receive registration information regarding a user from the associated user display device; and
assign a role to the user based on the registration information, the role defining one or more element groups for which the user is authorized to receive the constituent elements of the element groups for display on the corresponding user display device associated with the users.

22. The software of claim 21, operable to:
receive from the user a selection of an element within the one or more element groups defined by the role assigned to the user, the selection of the element indicating that the user desires to prevent the element from being communicated to the corresponding user display device associated with the user for display; and
terminate communication of the selected element to the corresponding user display device associated with the user for display on the user display device.

23. The software of claim 19, operable to maintain a table comprising, for each element group:
an element name for each element associated with the element group;
an element type of each element associated with the element group; and
one or more role names for each element associated with the element group, each role name for an element indicating a role defining one or more users that are authorized to receive the element for display on the corresponding user display device associated with the user.

24. The software of claim 19, further operable to maintain, for each user:
role information identifying the one or more roles assigned to the user; and
display list information identifying:
 the one or more constituent elements of each element group whose constituent elements the user is authorized to receive as defined by the one or more roles assigned to the user; and
 an indication for each of the one or more constituent elements of whether the user has indicated a desire to terminate display of the element on the corresponding user display device associated with user.

25. The software of claim 19, wherein:
each element comprises an element type indicating how the element is displayed on a user display device, and
when the element comprises state information regarding a supply chain of an enterprise, the element type comprises one or more of:
 sum element type; and
 a count element type.

26. The software claim 19, wherein:
each element comprises an element type indicating how the element is displayed on a user display device, and
when the element comprises alert information, the element type comprises an alert element type indicating that a particular event has occurred, the element comprising a notification for communication to the corresponding user display devices associated with users authorized to receive the element.

27. The software of claim 19, operable to communicate the corresponding element to a dashboard window displayed on the corresponding user display device associated with the user, the dashboard window comprising a separate window for each element group whose constituent elements the user is authorized to receive, the corresponding element being displayed in the separate window corresponding to the element group associated with the corresponding element.

* * * * *

UNITED STATES PATENT AND TRADEMARK OFFICE
CERTIFICATE OF CORRECTION

| | | |
|---|---|---|
| PATENT NO. | : 6,857,017 B1 | Page 1 of 2 |
| APPLICATION NO. | : 09/686442 | |
| DATED | : February 15, 2005 | |
| INVENTOR(S) | : Carolyn C. Faour and Richard Primeaux | |

It is certified that error appears in the above-identified patent and that said Letters Patent is hereby corrected as shown below:

In the Specification

1. Please amend the paragraph appearing at Column 3, lines 18-24, as indicated below:

Some events 18 are routed to various types of event handlers 20, which then use the incoming event message to process data. In many cases, event handlers 20 will also be classified as applications 12. In this application, event handlers 20 are generally any applications which make some use of the information provided by incoming event messages 18.

2. Please amend the paragraph appearing at Column 5, lines 8-15, as indicated below:

FIG. 4 shows five different event types, with various recipients registered to receive them. Some event types, such as EVENT TYPE 3 in this case, may not have any registered recipients. In such case, any events of this type are not routed to a handler. In most cases, however, one or more recipients will be registered to receive an event, and event router 16 will forward copies of the event message to all registered recipients.

3. Please amend the paragraph appearing at Column 5, lines 16-22, as indicated below:

By use of the event router, recipients can register to receive messages of various types without having any impact on the business objects which generate these events. Instead, the events are consistently passed to event router 16, from which any handler which needs to be copied on the event message receives its forwarded copy. Each handler will then deal with a message according to its internal logic.

4. Please amend the paragraph appearing at Column 6, lines 21-36, as indicated below:

FIG. 7 is a table showing some specific types of information contained within CRM 66 as an example. Table 76 has several columns representing information relating to a number of elements.

Signed and Sealed this
Twenty-ninth Day of March, 2016

Michelle K. Lee
*Director of the United States Patent and Trademark Office*

Column 78 is a group name, and the elements in this table are organized into three groups. Element name column 80 is the name of each element within each group, and columns 82 and 84, respectively, indicate whether the user has selected a particular element for display and whether the element is displayed by default until the user makes a specific selection. Column 86 indicates the type of information displayed for that element, and column 88 defines the user roles which have access to those elements. In the example of FIG. 7, a user in the role of purchaser has access to all elements in the "your orders" group and the "product alerts" element in the "your products" group.

In the Claims

5. Please amend Claim 13, Column 10, lines 14-24, as indicated below:

> 13. The system of claim 12, wherein the customer relationship monitor is operable to:
> receive from the user a selection of an element within the one or more element groups defined by the role assigned to the user, the selection of the element indicating that the user desires to prevent the element from being communicated to the corresponding user display device associated with the user for display; and
> terminate communication of the selected element to the user display device associated with the user for display on the user display device.